United States Patent
Imai et al.

(10) Patent No.: US 10,859,053 B2
(45) Date of Patent: Dec. 8, 2020

(54) SWITCH DEVICE

(71) Applicant: KABUSHIKI KAISHA TOKAI RIKA DENKI SEISAKUSHO, Aichi (JP)

(72) Inventors: Toshiaki Imai, Aichi (JP); Ryoji Takahashi, Aichi (JP); Shuichi Iwata, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 156 days.

(21) Appl. No.: 16/155,334

(22) Filed: Oct. 9, 2018

(65) Prior Publication Data

US 2019/0107097 A1  Apr. 11, 2019

(30) Foreign Application Priority Data

Oct. 11, 2017  (JP) .................... 2017-197373

(51) Int. Cl.

| | |
|---|---|
| F02N 11/08 | (2006.01) |
| H01H 13/00 | (2006.01) |
| B60K 37/06 | (2006.01) |
| H01H 13/06 | (2006.01) |
| H01H 9/04 | (2006.01) |

(Continued)

(52) U.S. Cl.
CPC ............ *F02N 11/087* (2013.01); *B60K 37/06* (2013.01); *F02D 11/02* (2013.01); *H01H 9/04* (2013.01); *H01H 13/00* (2013.01); *H01H 13/06* (2013.01); *H01H 13/12* (2013.01); *H01H 13/14* (2013.01); *B60K 35/00* (2013.01); *B60K 2370/1446* (2019.05); *F02N 11/0803* (2013.01); *F02N 2250/08* (2013.01); *H01H 2009/048* (2013.01); *H01H 2223/034* (2013.01)

(58) Field of Classification Search
CPC ............ H01H 9/02; H01H 9/04; H01H 13/06; H01H 13/12; H01H 13/14; H01H 13/00; H01H 2009/048; H01H 2223/034; F02N 11/02; F02N 11/0803; F02N 13/14; F02N 11/087; F02N 2250/08; F02D 11/02; B60K 2370/1446; B60K 35/00; B60K 37/06
USPC .................... 200/302.1, 302.2; 307/116, 10.3
See application file for complete search history.

(56) References Cited

U.S. PATENT DOCUMENTS

| | | | | |
|---|---|---|---|---|
| 5,671,840 A | * | 9/1997 | Glicksman | ............... H01H 9/04 |
| | | | | 200/302.2 |
| 6,576,854 B2 | * | 6/2003 | Yamanaka | ............... E05B 81/76 |
| | | | | 200/302.1 |

(Continued)

FOREIGN PATENT DOCUMENTS

| | | |
|---|---|---|
| JP | 2006-118481 A | 5/2006 |
| KR | 101045612 B1 * | 7/2011 |

*Primary Examiner* — Arnold M Kinkead
(74) *Attorney, Agent, or Firm* — Roberts Calderon Safran & Cole P.C.

(57) ABSTRACT

A switch device includes an operation button to be push-operated, and a sealing portion for sealing a gap between the operation button and an opening through which the operation button is inserted. The sealing portion may include a ring-shaped first seal that is in contact with the operation button and exhibits sealing properties, and a second seal that is harder than the first seal and is located on the outer side of the first seal. The first seal and the second seal may be integrated so as to form a frame of the sealing portion.

5 Claims, 4 Drawing Sheets

(51) Int. Cl.
*H01H 13/12* (2006.01)
*F02D 11/02* (2006.01)
*H01H 13/14* (2006.01)
*B60K 35/00* (2006.01)

(56) References Cited

U.S. PATENT DOCUMENTS 7,967,504 B2 * 6/2011 Tschumi ................ G04B 3/048
368/308
10,312,039 B2 * 6/2019 Ely ........................ H03K 17/97

* cited by examiner

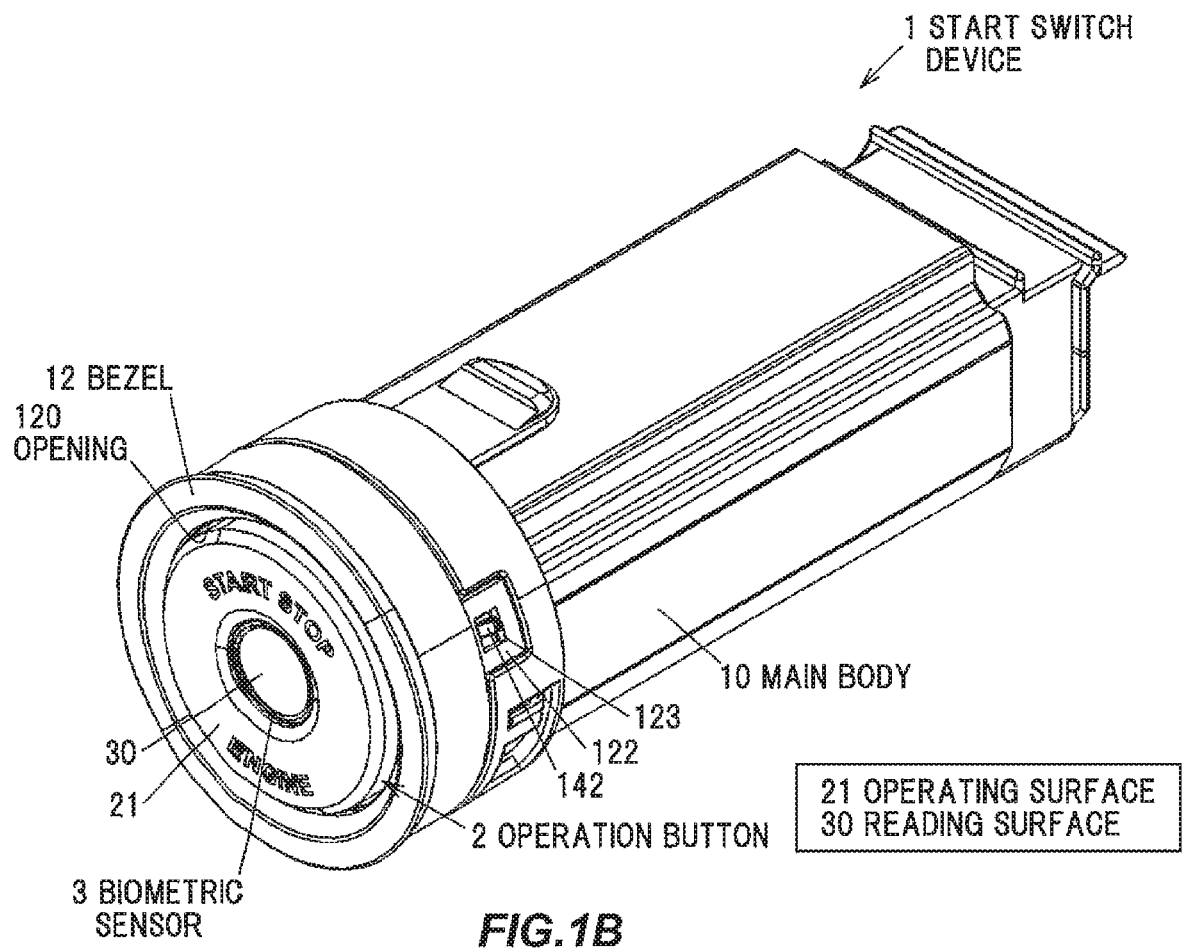
FIG.1B
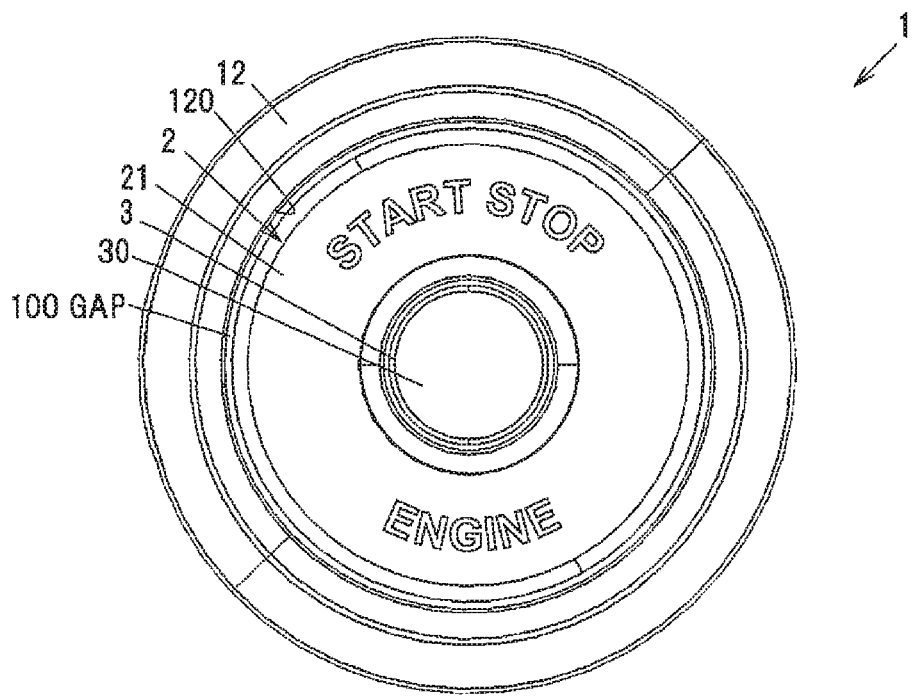

SWITCH DEVICE

CROSS-REFERENCE TO RELATED APPLICATION

The present application is based on Japanese patent application No. 2017-197373 filed on Oct. 11, 2017, the entire contents of which are incorporated herein by reference.

TECHNICAL FIELD

The invention relates to a switch device.

BACKGROUND ART

Engine start control device is known as a conventional technique, which is provided with an engine start switch for giving an instruction to start an engine mounted on a vehicle, and first and second control circuits which are fed with power from a power source mounted on the vehicle and control engine start when the engine start switch is turned on and the instruction to start the engine is given (see, e.g., JP 2006/118481 A).

The engine start switch is constructed from a momentary push button switch and is turned on by a push operation.

SUMMARY OF INVENTION

Technical Problem

Some of such engine start control devices have a structure in which, e.g., a labyrinthine structure is combined with a drain outlet to prevent extraneous matter from getting inside through a gap between an operation button of a switch and a main body. In recent years, however, steam cleaner is sometimes used for cleaning. Thus, prevention of not only entrance of extraneous matter but also entrance of steam (vapor) is necessary.

It is an object of the invention to provide a switch device that prevents the extraneous matter and steam from entering the main body.

Solution to Problem

According to an embodiment of the invention, a switch device comprises:
an operation button to be push-operated; and
a sealing portion for sealing a gap between the operation button and an opening through which the operation button is inserted.

According to an embodiment of the invention, a switch device can be provided that prevents the extraneous matter and steam from entering the main body.

BRIEF DESCRIPTION OF DRAWINGS

FIG. 1A is a perspective view showing an example of a start switch device in an embodiment.

FIG. 1B is a front view showing the example of the start switch device.

DESCRIPTION OF EMBODIMENTS

Summary of Embodiment

A switch device in the embodiment is generally provided with a sealing portion for sealing a gap between an operation button to be push-operated and an opening through which the operation button is inserted.

In this switch device, a gap between the operation button and a main body is sealed with the sealing portion. Therefore, it is possible to prevent extraneous matter and steam from entering the main body, unlike when having a combination of the labyrinthine structure with the drain outlet.

Embodiment

General Description of Start Switch Device 1

Figure 2:
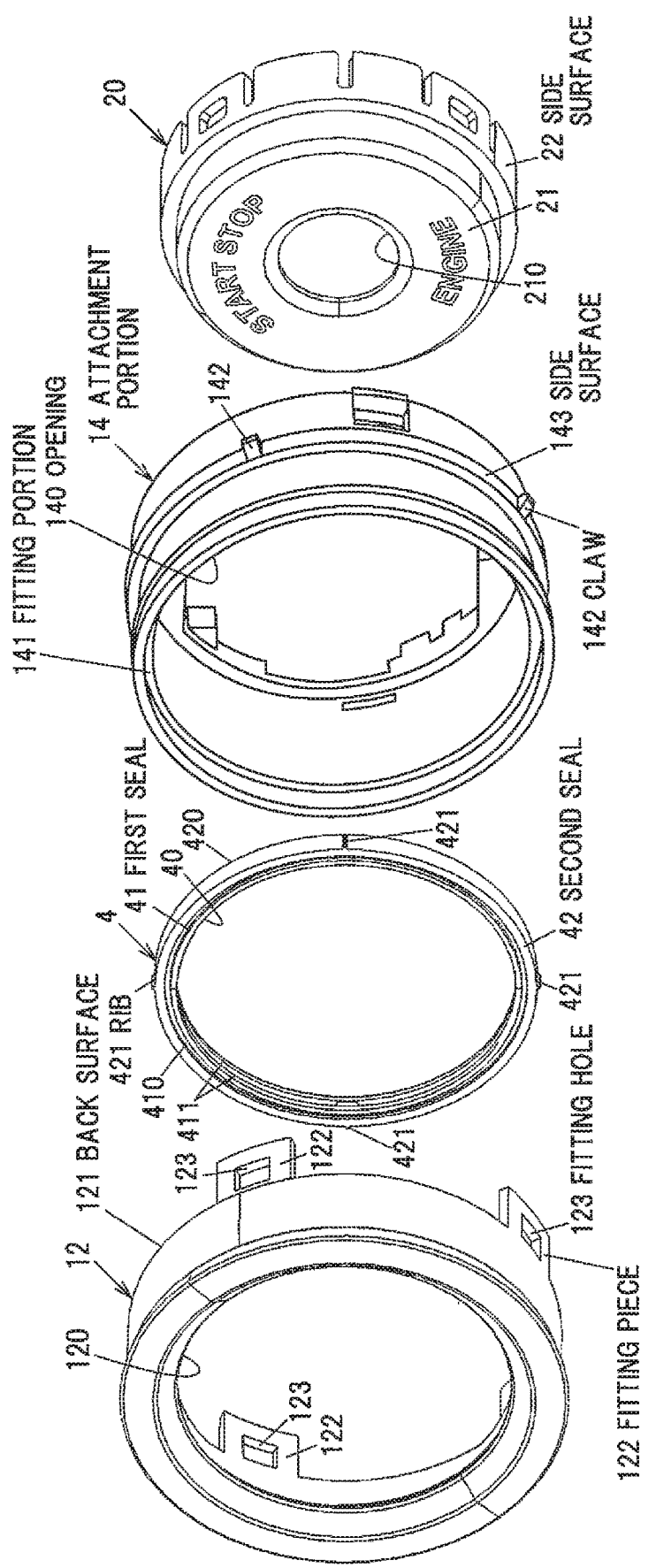
FIG. 2 is a schematic diagram illustrating an example of a bezel, a sealing portion, an attachment portion and an operating portion of the start switch device in the embodiment.
Figure 3A:
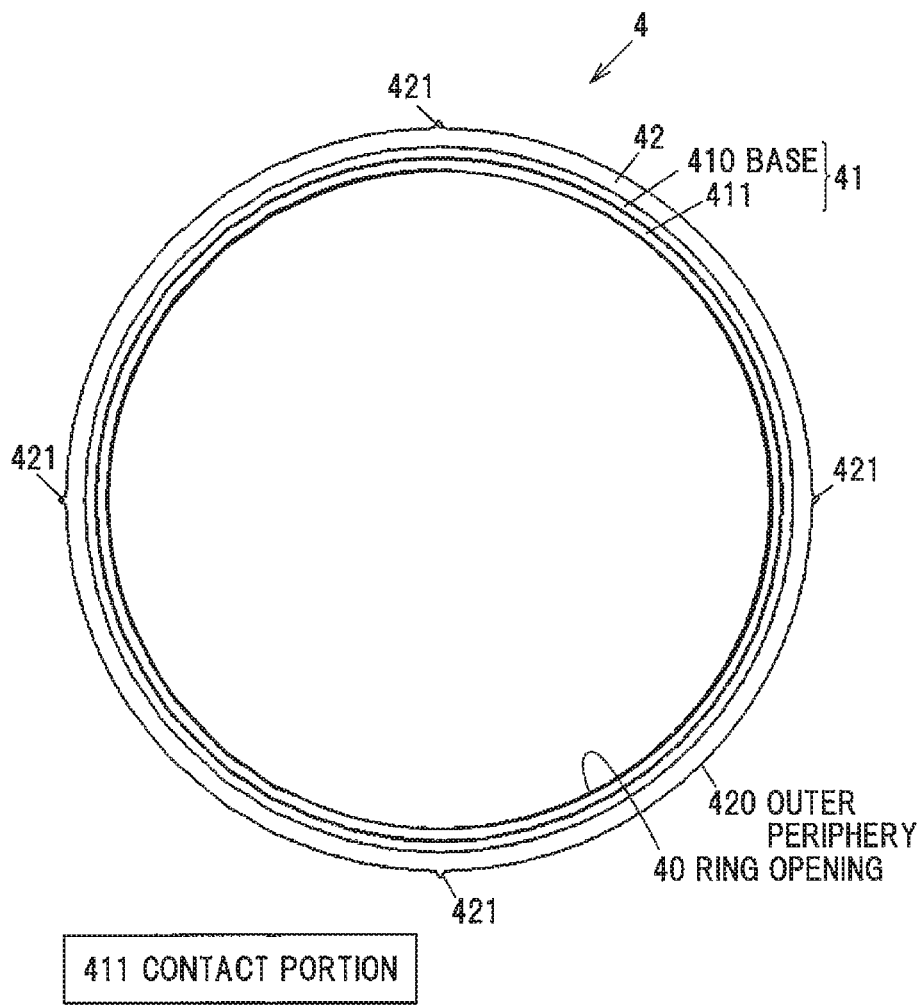
FIG. 3A is a front view showing the example of the sealing portion of the start switch device in the embodiment.
Figure 3B:
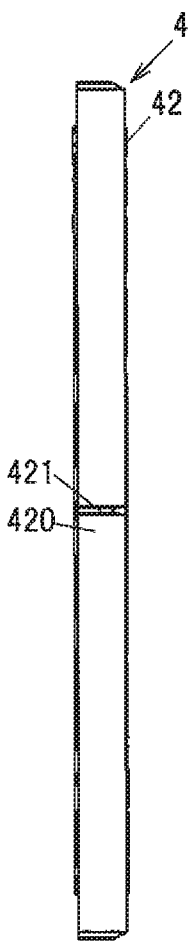
FIG. 3B is a side view showing the example of the sealing portion.
Figure 3C:
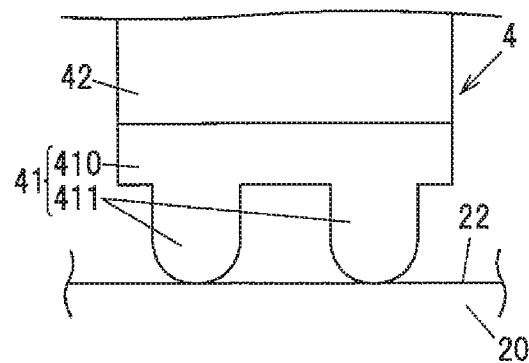
FIG. 3C is an explanatory schematic diagram illustrating an example of a contact portion between the sealing portion and the operating portion.

FIG. 1A is a perspective view showing an example of a start switch device in an embodiment and FIG. 1B is a front view showing the example of the start switch device. FIG. 2 is a schematic diagram illustrating an example of a bezel, a sealing portion, an attachment portion and an operating portion of the start switch device in the embodiment. FIG. 3A is a front view showing the example of the sealing portion of the start switch device in the embodiment, FIG. 3B is a side view showing the example of the sealing portion, and FIG. 3C is an explanatory schematic diagram illustrating an example of a contact portion between the sealing portion and the operating portion. In each drawing of the embodiment described below, a scale ratio may be different from an actual ratio. The extraneous matter here is, e.g., liquid such as water, dirt or dust, etc. The steam is vapor.

The start switch device 1 as the switch device is generally provided with, e.g., a sealing portion 4 for sealing a gap 100 between an operation button 2 to be push-operated and an opening 120 through which the operation button 2 is inserted, as shown in FIGS. 1A and 1B.

The sealing portion 4 has, e.g., a ring shape as shown in FIGS. 2 to 3C and is generally provided with a ring-shaped first seal 41 which is in contact with the operation button 2 and exhibits sealing properties, and a second seal 42 which is harder than the first seal 41 and is located on the outer side of the first seal 41. The first seal 41 and the second seal 42 are integrated and form a frame of the sealing portion 4.

A main body 10 is generally provided with, e.g., a bezel 12 having the opening 120 to expose the operation button 2 and an attachment portion 14 to which the bezel 12 is attached, as shown in FIG. 2.

The attachment portion 14 has, e.g., a shape of cylinder as shown in FIG. 2, and is configured that the operation button 2 is inserted through the cylinder and the sealing portion 4 is attached to an edge of the cylinder.

The start switch device 1 is also provided with a biometric sensor 3 which has, e.g., a reading surface 30 exposed in an opening 210 formed on an operating surface 21 as shown in FIGS. 1A and 1B and reads, during a push operation, biometric information of an operator who touches the reading surface 30.

As an example, the start switch device 1 is configured that the biometric sensor 3 can read the biometric information after doors are unlocked upon authentication based on wireless communication with an electronic key, etc., and drive voltage is supplied from a battery of a vehicle.

In the vehicle, a drive system is started when switches of the start switch device 1 are turned on by a push operation and identity is established by the matching of the biometric information.

The drive system is, e.g., an internal combustion engine, a motor, or a combination thereof, etc. The start switch device 1 is configured to give an instruction to start/stop the drive system. However, the switch device is not limited to the start switch device 1 for giving an instruction to start/stop a drive system of a vehicle and can be used for other purposes.

Configuration of the Main Body 10

The main body 10 has, e.g., a shape of long cylinder as shown in FIG. 1A, and the operation button 2 is inserted into the cylinder. The bezel 12 is a member located at an end of the main body 10 and has the gap 100 between itself and the operation button 2.

The bezel 12 has, e.g., three fitting pieces 122 each having a fitting hole 123 and protruding rearward from a back surface 121, as shown in FIG. 2. The attachment portion 14 has, e.g., claws 142 which are formed on a side surface 143 as shown in FIG. 2 and are to be fitted to the fitting holes 123. That is, the bezel 12 is integrated with the attachment portion 14 by fitting the claws 142 to the fitting holes 123.

The attachment portion 14 has, e.g., a fitting portion 141 as shown in FIG. 2 which is formed by providing a level difference at an edge on the bezel 12 side. The sealing portion 4 is fitted to the fitting portion 141. The attachment portion 14 has an opening 140 through which the operation button 2 is inserted.

Configuration of the Operation Button 2

The operation button 2 has, e.g., an operating portion 20 at a top end and a surface of the operating portion 20 is the operating surface 21, as shown in FIG. 2. The operation button 2 is provided with a substrate, and a member to which the operating portion 20 is attached, etc.

The opening 210 having a circular shape is formed on the operating surface 21 of the operating portion 20. A portion around the opening 210 is tapered. As an example, the opening 210 has a size allowing sufficient contact between an operating finger and the reading surface 30.

The operating portion 20 is inserted into a ring opening 40 of the sealing portion 4. The first seal 41 of the sealing portion 4 is in contact with a side surface 22 of the operating portion 20.

Configuration of the Biometric Sensor 3

The biometric sensor 3 is arranged so that the reading surface 30 is located at the center of the operating surface 21 of the operation button 2. The biometric sensor 3 is configured that the reading surface 30 for reading the biometric information has a circular shape and is exposed on the operating surface 21. The position of the reading surface 30 is lower than, e.g., the operating surface 21.

The biometric sensor 3 is configured to read the biometric information of the operating finger in contact with the operating surface 21. As an example, the biometric information includes image information of at least one of fingerprint pattern and vein pattern of the operating finger.

When configured to read, e.g., a fingerprint pattern, the biometric sensor 3 is generally constructed from an optical, capacitive, electric field strength measuring, pressure-sensitive, or thermal sensor.

Meanwhile, when configured to read, e.g., a vein pattern, the biometric sensor 3 is generally configured to read a vein pattern based on reflection of infrared radiation.

As an example, the biometric sensor 3 in the present embodiment is a capacitive sensor which reads a fingerprint.

Configuration of the Sealing Portion 4

The sealing portion 4 is provided with the first seal 41 and the second seal 42, as described above. The first seal 41 is generally provided with, e.g., a base 410 integrated with the second seal 42, and two contact portions 411 in contact with the operating portion 20, as shown in FIGS. 3A to 3C.

The first seal 41 and the second seal 42 are, e.g., co-molded or bonded. As an example, the first seal 41 is formed of a resin material which is softer than the second seal 42 and is easily elastically deformed by displacement of the operation button 2 caused by a push operation, such as elastomer rubber or cyanogen rubber. Meanwhile, the second seal 42 is formed of a resin material, which is harder than the first seal 41, such as ABS (acrylonitrile butadiene styrene).

The two contact portions 411 of the first seal 41 are formed, e.g., side by side as shown in FIG. 3C, are in contact with the side surface 22 of the operating portion 20 and exhibits sealing properties. The operating surface 21 is located on the left side of the paper of FIG. 3C. Thus, extraneous matter or steam comes from the left side to the right side along the side surface 22, but it is possible to prevent its entrance by the contact portions 411.

When, e.g., the operating portion 20 is displaced rightward and leftward of the paper of FIG. 3C, the two contact portions 411 are elastically deformed and follow the movement in the displacement direction of the operating portion 20 due to friction against the side surface 22. The number of the contact portions 411 is not limited to two and may be, e.g., one, or more than two.

The second seal 42 is formed of a resin material less likely to deform and is thus easily fitted to the fitting portion 141 of the attachment portion 14. The second seal 42 has, e.g., four small ribs 421 on an outer periphery 420. The ribs 421 are squashed when fitting the sealing portion 4 to the fitting portion 141 and the sealing portion 4 is thus less likely to come off from the fitting portion 141.

Figure 4A:
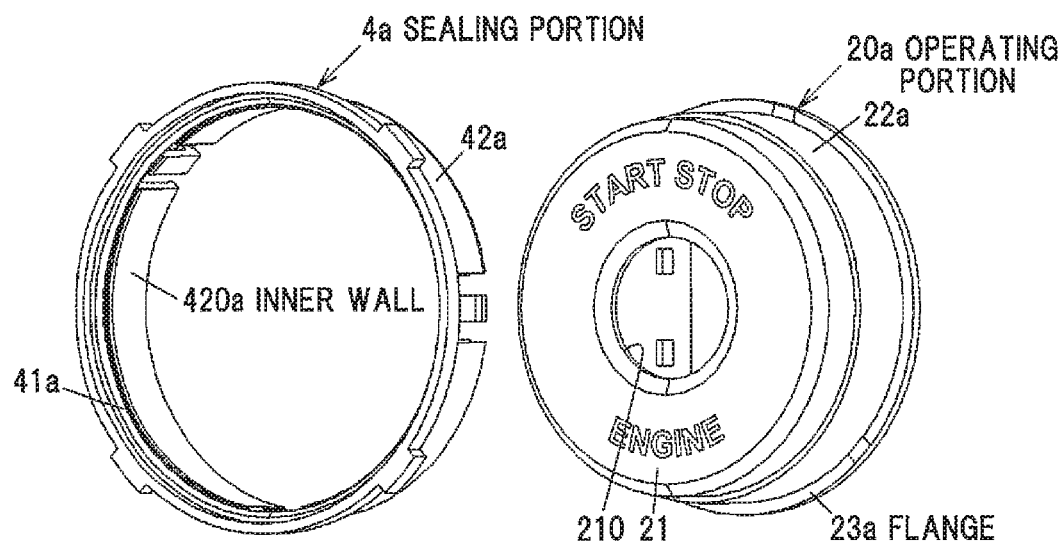
FIG. 4A is a perspective view showing an example of the sealing portion in a modification.
Figure 4B:
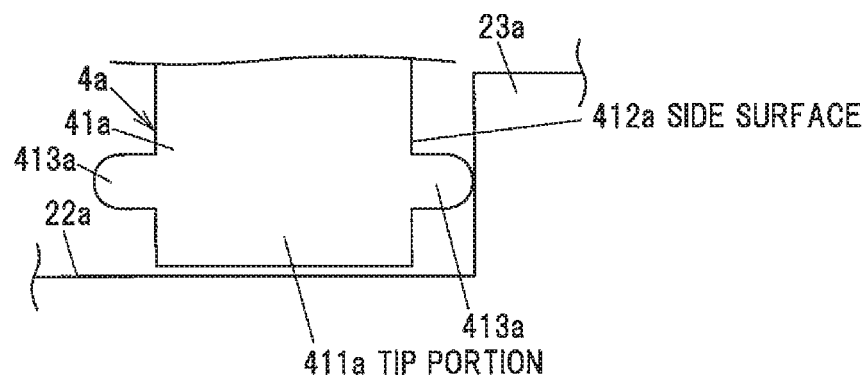
FIG. 4B is an explanatory schematic diagram illustrating an example of a contact portion between the sealing portion and the operating portion in the modification.

FIG. 4A is a perspective view showing an example of the sealing portion in a modification and FIG. 4B is an explanatory schematic diagram illustrating an example of a contact portion between the sealing portion and the operating portion in the modification. The portions regarded as having the same function and structure as those in the embodiment are denoted by the same reference numerals.

A sealing portion 4a in the modification is provided with, e.g., a first seal 41a and a second seal 42a, as shown in FIGS. 4A and 4B. An operating portion 20a here has a shape which corresponds to the sealing portion 4a and is different from the shape of the operating portion 20 in the embodiment.

The operating portion 20a in the modification is provided with, e.g., a flange 23a at an edge of a side surface 22a, as shown in FIGS. 4A and 4B.

The second seal 42a is formed of, e.g., a resin material such as ABS and has a cylindrical shape. Meanwhile, the first seal 41a is formed of, e.g., a resin material softer than the second seal 42a, such as elastomer rubber or cyanogen rubber. The first seal 41a is provided on an inner wall 420a of the second seal 42a. The first seal 41a and the second seal 42a are co-molded or bonded.

The first seal 41a has, e.g., a tip portion 411a facing the side surface 22a of the operating portion 20a, as shown in FIG. 4B. A protrusion 413a is formed on a side surface 412a of the tip portion 411a. The protrusion 413a is in contact with the flange 23a of the operating portion 20a and exhibits sealing properties. As another modification, the first seal 41a may be configured such that the tip portion 411a is also in contact with the side surface 22a, or such that a contact portion to be in contact with the side surface 22a is formed on the tip portion 411a.

The operating surface 21 is located on the left side of the paper of FIG. 4B. Thus, extraneous matter or steam comes from the left side to the right side along the side surface 22a, but it is possible to prevent its entrance by the protrusion 413a.

Effects of the Embodiment

The start switch device 1 in the present embodiment can prevent extraneous matter and steam from entering the main body 10. In the start switch device 1, the gap 100 between the operation button 2 and the opening 120 is sealed with the sealing portion 4. Therefore, it is possible to prevent extraneous matter and steam from entering the main body 10, unlike when having a combination of the labyrinthine structure with the drain outlet.

The start switch device 1 is configured that the plural contact portions 411 of the sealing portion 4 are in contact with the side surface 22 of the operating portion 20. Therefore, unlike when the sealing portion is in contact with the side surface in a large area and the frictional force is large, it is possible to prevent a decrease in operational feeling due to the frictional force while preventing entrance of extraneous matter and steam.

In the start switch device 1, the sealing portion 4 is composed of the soft first seal 41 and the hard second seal 42 which are integrally formed co-molding or bonding. Therefore, unlike when such configuration is not adopted, sealing properties are improved by the soft first seal 41 and, at the same time, ease of assembly is improved by the hard second seal 42. Thus, the start switch device 1 can achieve both sealing properties and easy assembly by the sealing portion 4.

Although some embodiment and modifications of the invention have been described, the embodiment and modifications are merely an example and the invention according to claims is not to be limited thereto. The new embodiment and modifications may be implemented in various other forms, and various omissions, substitutions and changes, etc., can be made without departing from the gist of the invention. In addition, all combinations of the features described in the embodiment and modifications are not necessary to solve the problem of the invention. Further, the embodiment and modifications are included within the scope and gist of the invention and also within the invention described in the claims and the range of equivalency.

The invention claimed is:

1. A switch device, comprising:
an operation button to be push-operated;
a main body comprising an opening in which the operation button sits; and
a sealing portion for sealing a gap between the operation button and the opening,
wherein the sealing portion comprises:
a ring-shaped first seal that is in contact with the operation button and exhibits sealing properties; and
a second seal that is harder than the first seal and is located on the outer side of the first seal, and
wherein the first seal and the second seal are integrated so as to form a frame of the sealing portion,
wherein the main body is disposed outside of the second seal, and
wherein the sealing portion is not fixed to the operation button,
wherein the main body further includes a bezel comprising an opening to expose the operation button and an attachment portion to which the bezel is attached, and
wherein the attachment portion has a shape of a cylinder, the operation button is inserted through the cylinder, and the sealing portion is attached to an edge of the cylinder.

2. The switch device according to claim 1, wherein the operation button comprises a vehicle drive system start switch.

3. The switch device according to claim 1, wherein the first seal is elastically deformed while contacting the operation button when the operation button is displaced.

4. A switch device, comprising:
an operation button to be push-operated;
a main body comprising an opening in which the operation button sits; and
a sealing portion for sealing a gap between the operation button and the opening,
wherein the sealing portion comprises:
a ring-shaped first seal that is in contact with the operation button and exhibits sealing properties; and
a second seal that is harder than the first seal and is located on the outer side of the first seal, and
wherein the first seal and the second seal are integrated so as to form a frame of the sealing portion,
wherein the main body is disposed outside of the second seal, and
wherein the sealing portion is not fixed to the operation button,
wherein the first seal comprises a base integrated with the second seal and a contact portion to contact the operation button, and wherein the contact portion protrudes from the base in a radial direction of the operation button.

5. The switch device according to claim 4, wherein the contact portion of the first seal comprises more than one contact portion.

* * * * *